(12) United States Patent
Xiao et al.

(10) Patent No.: US 11,415,433 B2
(45) Date of Patent: Aug. 16, 2022

(54) METHOD FOR CALIBRATING A MULTI-SENSOR SYSTEM USING AN ARTIFICIAL NEURAL NETWORK

(71) Applicant: Robert Bosch GmbH, Stuttgart (DE)

(72) Inventors: Huang Xiao, Ostelsheim (DE); Marco Lampacrescia, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 16/879,335

(22) Filed: May 20, 2020

(65) Prior Publication Data

US 2020/0378793 A1 Dec. 3, 2020

(30) Foreign Application Priority Data

May 28, 2019 (EP) .................................... 19176913

(51) Int. Cl.
*G01C 25/00* (2006.01)

(52) U.S. Cl.
CPC .................................... *G01C 25/00* (2013.01)

(58) Field of Classification Search
CPC ...... G01C 25/00; G01C 25/005; G06N 3/008; G06N 3/0445; G06N 3/08; G06N 3/0454; G06N 3/084; G01D 18/00
See application file for complete search history.

(56) References Cited

U.S. PATENT DOCUMENTS

| | | | | |
|---|---|---|---|---|
| 4,852,018 A * | 7/1989 | Grossberg | ................ | B25J 9/163 706/904 |
| 5,428,710 A * | 6/1995 | Toomarian | ................ | G06N 3/08 706/25 |
| 5,930,781 A * | 7/1999 | Toomarian | ................ | G06N 3/08 706/16 |
| 10,699,407 B2 * | 6/2020 | Isgum | ................. | A61B 6/5217 |
| 2002/0065633 A1 * | 5/2002 | Levin | .................. | G06K 9/6232 702/189 |

(Continued)

OTHER PUBLICATIONS

N. Schneider et al., "Regnet: Multimodal Sensor Registration Using Deep Neural Networks", Cornell University, 2017, pp. 1-8. https://arxiv.org/pdf/1707.03167.

(Continued)

*Primary Examiner* — David J Bolduc
(74) *Attorney, Agent, or Firm* — Norton Rose Fulbright US LLP; Gerard Messina (57) ABSTRACT

A method for calibrating a sensor with respect to a reference trajectory indicating a number of timely successive data values using an encoder/decoder neural network with an encoder function and a successive decoder function. The method includes training the encoder function and the decoder function of the encoder/decoder neural network with respect to a reference trajectory so that a reconstruction error of the reference trajectory at an input of the encoder function and a reconstructed reference trajectory at an output of the decoder function is minimized; training a calibration vector with respect to a sensor trajectory so that a reconstruction error between an output sensor trajectory and a corresponding reference trajectory is minimized, the output sensor trajectory is obtained by applying the calibration vector on the sensor trajectory and the encoder function and decoder function on the the calibrated sensor trajectory; and applying the calibration vector to calibrate the sensor.

10 Claims, 4 Drawing Sheets

(56) References Cited

U.S. PATENT DOCUMENTS

| | | | |
|---|---|---|---|
| 2015/0039545 A1* | 2/2015 | Li | G05B 13/027 |
| | | | 706/23 |
| 2018/0120843 A1* | 5/2018 | Berntorp | G06V 20/56 |
| 2018/0124423 A1* | 5/2018 | Choi | H04N 19/52 |
| 2018/0250075 A1* | 9/2018 | Cho | A61B 34/32 |
| 2018/0365533 A1* | 12/2018 | Sathyanarayana | G08G 1/0112 |
| 2019/0033085 A1* | 1/2019 | Ogale | G06N 3/0454 |
| 2019/0034794 A1* | 1/2019 | Ogale | G06N 3/08 |
| 2019/0107642 A1* | 4/2019 | Farhadi Nia | G06F 30/20 |
| 2019/0122101 A1* | 4/2019 | Lei | G06F 17/16 |
| 2019/0184561 A1* | 6/2019 | Yip | G06N 5/046 |
| 2019/0258251 A1* | 8/2019 | Ditty | G06V 20/58 |
| 2019/0317519 A1* | 10/2019 | Chen | G06V 10/82 |
| 2020/0174490 A1* | 6/2020 | Ogale | G05D 1/0221 |
| 2020/0192359 A1* | 6/2020 | Aragon | G05D 1/0221 |
| 2020/0239029 A1* | 7/2020 | Kim | B60W 60/0015 |
| 2020/0301021 A1* | 9/2020 | Odd | G06V 10/454 |
| 2021/0390397 A1* | 12/2021 | Alvelda, VII | G06N 3/0454 |

OTHER PUBLICATIONS

G. Iyer et al., "Calibnet: Self-Supervised Extrinsic Calibration Using 3D Spatial Transformer Networks", Cornell University, 2019, pp. 1-8. https://arxiv.org/pdf/1803.08181.

\* cited by examiner

METHOD FOR CALIBRATING A MULTI-SENSOR SYSTEM USING AN ARTIFICIAL NEURAL NETWORK

CROSS REFERENCE

The present application claims the benefit under 35 U.S.C. § 119 of European Application No. EP 19176913.2 filed on May 28, 2019, which is expressly incorporated herein by reference in its entirety.

FIELD

The present invention relates to multi-sensor systems with a plurality of sensors for sensing correlated measures. The present invention particularly relates to methods for calibrating sensors in a multi-sensor system.

BACKGROUND INFORMATION

For many tasks, such as localization, mapping, tracking, and the like, multi-sensor systems are applied. In a technical system, multiple sensors are often used which are arranged offset from each other to provide at least partly redundant and/or correlated sensor readings. For instance, multiple position and inertia sensors may be used on different positions on a robot which provide correlated sensor readings when the robot moves.

The quality of carrying out a specific task using the sensor readings of these multiple sensors is extremely sensitive to the calibration of the sensors used for the task. For sensors measuring the same or related measures, particularly, sensor orientation and position as well as their accuracy strongly affect the measurement results and essentially determine the performance of the technical system. If the exact relation between the multiple sensors, such as their relative orientation and position, is initially unknown, a sensor calibration is required to improve the functionality of the technical system.

Conventionally, one approach to calibrate sensors of a technical system includes manually adapting calibration parameters of the sensors. Manual calibration has the known disadvantages of inaccuracy and long duration.

A method for automatic calibration is, e.g., described in N. Schneider et al., "RegNet: Multimodal Sensor Registration Using Deep Neural Networks", https://arxiv.org/pdf/1707.03167.pdf, wherein by means of a first deep convolutional neural network (CNN) a 6 degrees of freedom (DOF) extrinsic calibration between multimodal sensors is carried out wherein the conventional calibration steps (feature extraction, feature matching and global regression) are performed in a single real-time capable CNN.

Furthermore, G. Iyer et al., "CalibNet: Self-Supervised Extrinsic Calibration using 3D Spatial Transformer Networks", https://arxiv.org/pdf/1803.08181.pdf, describes a self-supervised deep network capable of automatically estimating the 6-DoF rigid body transformation between a 3D LiDAR and a 2D camera. The network is trained to predict calibration parameters that maximize the geometric and photometric consistency of the input images and point clouds.

SUMMARY

According to the present invention, a method for calibrating one or more sensors of a multi-sensor system, a calibration system and a multi-sensor system are provided. Further embodiments and developments of the present invention are described herein.

According to a first aspect of the present invention, an example method for calibrating a sensor with respect to a reference trajectory indicating a number of timely successive data values using an encoder/decoder neural network with an encoder function and a successive decoder function is provided, comprising the steps of:

Training in a first training phase the encoder function and the decoder function of the encoder/decoder neural network with respect to at least one reference trajectory so that a reconstruction error of the reference trajectory at an input of the encoder function and a reconstructed reference trajectory at an output of the decoder function is minimized, Training in a second training phase a calibration vector, and particularly the encoder function and the decoder function of the encoder/decoder neural network, with respect to a sensor trajectory so that a reconstruction error between an output sensor trajectory and a corresponding reference trajectory is minimized, wherein the output sensor trajectory is obtained by applying the calibration vector on the sensor trajectory and by applying the encoder and decoder function on the calibrated sensor trajectory; and Applying the calibration vector to calibrate the sensor.

In a sensor system with multiple sensors with correlated sensor readings, such as a plurality of distributed sensors for sensing a position or a movement of a movable system, sensor offsets, noise, sensor inaccuracy, external interventions and the like make the conventional approaches to calibrate the multiple sensors of the multi-sensor system complex or even impossible for high precision calibration.

Generally, for calibration, sensor trajectories of the sensors to be calibrated are used and brought into relation towards a reference trajectory indicating the ground true system behavior during the same time frame. General issues for calibrating sensors using sensor trajectories of sensor readings are the unknown local relations, such as positional offsets of the sensors and the different time domains or the sensor readings, i.e., that each single sensor reading might have a certain off-time delay so that the sensor readings from different sensors might not match exactly on a specific time step.

Matching trajectories with different off-time delays in combination with sensor noise, unknown local sensor distribution, and sensor inaccuracies are common constraints when a multi-sensor system shall be calibrated.

The above example method provides an approach using an artificial neural network which can handle the complex environmental dynamics of uncertainties and noises of a multi-sensor system.

Assuming the calibration of each sensor can be expressed by a calibration vector, which is configured with one or more dimensions. The calibration vector can be applied on a sensor trajectory to transform the sensor reading, i.e., sensor trajectory of one of the calibrated sensors, to the reference trajectory, such as a sensor trajectory of a reference sensor of the multi-sensor system obtained within the same time frame, it is a task to automatically calibrate the sensors of the sensor system by adapting the respective calibration vector. So, each sensor trajectory of each of the sensors to be calibrated can be applied with the respective calibration vector and thus be brought in line with the reference trajectory of e.g. the reference sensor by means of the calibration vector.

The above method applies a recurrent neural network as an LSTM (Long-Short Term Memory) encoder/decoder neural network. The LSTM encoder/decoder neural network includes an encoder LSTM unit to compress calibrated trajectories of sensor readings of a specific sensor to be calibrated and to obtain an intermediate vector representing a lower dimensional manifold. The calibrated trajectories are a result of calibration of the sensor trajectories of the sensor to be calibrated by means of a candidate calibration vector or an applied calibration vector. The intermediate vector as a result of the encoder LSTM unit represents compressed information and represents the characteristics of the corresponding sensor behavior.

Succeeding the encoder LSTM unit, a decoder LSTM unit is applied to receive the intermediate vector and to reconstruct the sensor trajectories from the intermediate vector such that the reconstructed trajectories can be matched to the given reference trajectory.

The reference trajectory may be used to further compute an attention map to determine the likelihood of what time steps of input sensor trajectories attention should be paid to. This intrinsically gives the time delay offset estimate of the sensors.

The calibration is made for each sensor by solving an optimization problem to match the reconstructed sensor trajectory with the reference trajectory by adapting the calibration vector to reduce the reconstruction error. Furthermore, during the optimization, also the encoder parameters of the encoder LSTM unit, the decoder parameters of the decoder LSTM unit and the attention map are optimized to obtain a parametrization of the respective sensor.

The attention map has elements that represent weights indicating the relation between each time-step of the output trajectory (output of the decoder LSTM unit) to the time steps of the sensor trajectory (input trajectory) so to estimate the off-time delay using the look-back attention.

For each sensor to be calibrated, the system has to be trained by a plurality of sensor trajectories of the specific sensor and a plurality of corresponding reference trajectories associated with the plurality of sensor trajectories, i.e., the sensor trajectories and the reference trajectories both are obtained during the same time frame of a system's action. During the training the LSTM encoder/decoder neural network and particularly the calibration vectors can be optimized.

The above described example method allows performing an automatic calibration process for multiple sensors with respect to a reference trajectory. By using the above configuration of the artificial neural network automatic calibration is highly robust against noise, sensor inaccuracies and off-time delays.

Furthermore, the first and second training phases may be alternately applied each for a number of training cycles, particularly until a convergence criteria is satisfied.

It may be provided that in the second training phase, an attention map is considered which is applied on the output sensor trajectory of the decoder function and wherein the training is configured to minimize the reconstruction error between the output sensor trajectory to which the attention map is applied and a corresponding reference trajectory.

Moreover, the encoder function and decoder function corresponds to an encoder LSTM function and a decoder LSTM function, respectively.

According to an example embodiment of the present invention, the encoder function may be configured to generate an intermediate vector corresponding to a lower dimensional manifold and the decoder function is configured to expand the output trajectory having the same dimension as the input trajectory a decoder LSTM function.

It may be provided that the sensor trajectory of the sensor to be calibrated and the corresponding reference trajectory are related to the same time frame.

Furthermore, the reference trajectory may be obtained by a reference sensor wherein the reference sensor and the sensor to be calibrated belong to the same multi-sensor system.

BRIEF DESCRIPTION OF THE DRAWINGS

Example embodiments of the present invention are described in more detail in conjunction with the figures.

FIG. 1 shows a system with a robot with a multi-sensor arrangement to detect a trajectory of positions as an example for a system in which the automatic calibration process can be applied on.

DETAILED DESCRIPTION OF EXAMPLE EMBODIMENTS

Figure 1:
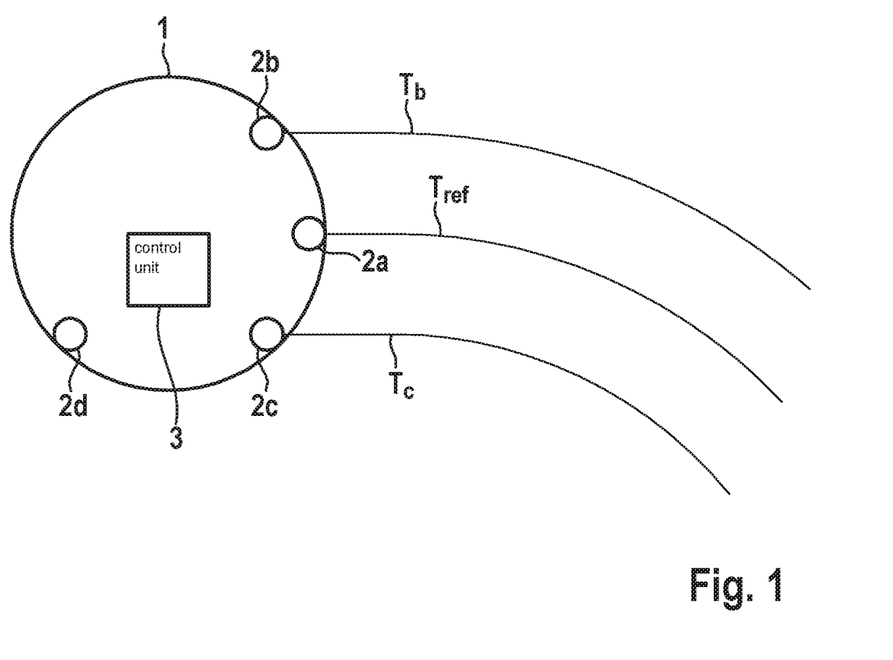

FIG. 1 shows exemplarily a moveable robot 1, such as a robot vacuum cleaner, which has a plurality of sensors 2 rigidly mounted with respect to the housing of the robot 1. The sensors 2 may be position sensors to provide a sensor reading indicating position data per time instant. For successive time steps, the position data define a sensor trajectory for each of the sensors 2. Generally, the robot 1 has a control unit 3 which controls operation of the robot 1. The operation is controlled depending on the sensor readings of the sensors 2 to perform a predefined task, for example in case of a vacuum cleaner to move the robot 1 over an area to clean the area's surface.

The sensors 2 are further referenced by indices a, b, c, d, wherein the sensor 2a serves as a reference sensor that is the target sensor other sensors 2b, 2c, 2d are calibrated towards. The reference sensor 2a provides sensor readings which form the reference trajectory $T_{ref}$ within a specific time frame.

To calibrate the relative position and orientation of other sensors 2b, 2c, 2d which are denoted by $\{(r_b,t_b), (r_c,t_c), \ldots\}$ where r and t represent the rotation and translation vectors for calibration of the respective sensor (defined by the index) so that after applying the rotation and translation vectors on the detected sensor trajectories Tb, Tc, . . . of the corresponding sensors (obtained during the same time frame), they will match the reference trajectory provided by the reference sensor 2a.

The sensor trajectories Tb, Tc, . . . are indicated by position data for successive time steps wherein the time steps must not necessarily correspond to the time steps of the reference trajectory Tref provided by the reference sensor 2a. furthermore, the sensors each have their own sensor characteristics, provide noise and have individual inaccuracies. Therefore, it is a task to match the time step-based trajectories towards one another, while additionally considering intrinsic inaccuracies and environmental noises.

According to the herein described example embodiment of the method according to the present invention, this task is accomplished by means of an encoder/decoder neural network. The encoder/decoder neural network may basically be formed as an LSTM encoder/decoder neural network (LSTM: long short-term memory) but can also be implemented using different kinds of neural networks.

Substantially the ecoder/decoder neural network comprises an encoder unit followed by a decoder unit. Wherein the encoder unit compresses the trajectory data to an intermediate vector and the decoder network decompresses the trajectory to reconstruct the input trajectory. Furthermore, an attention map is used to correct time related mismatches between the input sensor trajectories and the corresponding reference trajectory.

Figure 2A:
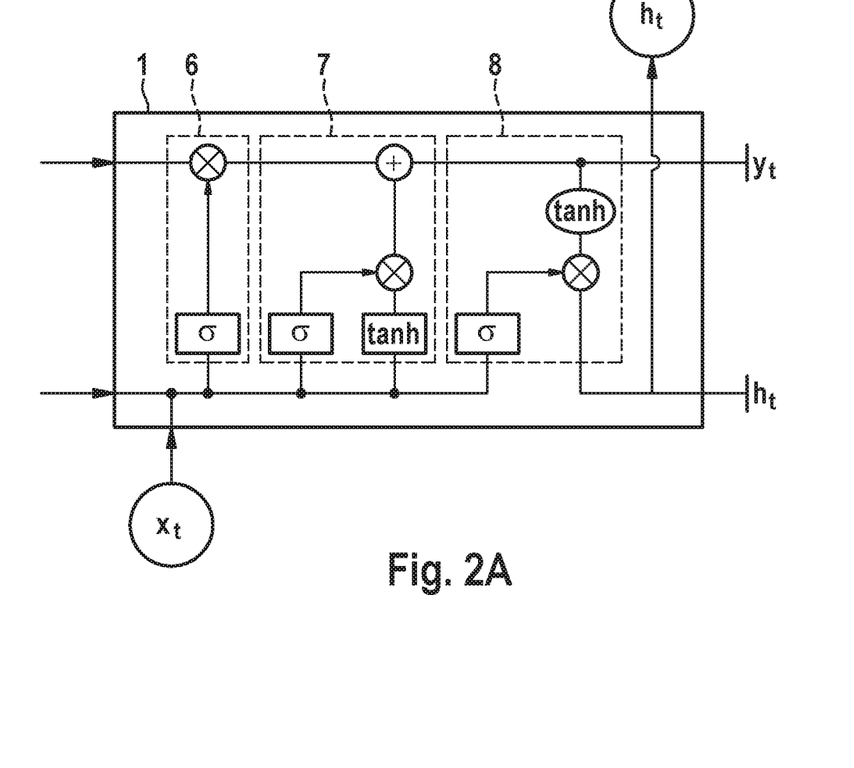
FIG. 2A schematically shows a conventional LSTM neural network.
Figure 2B:
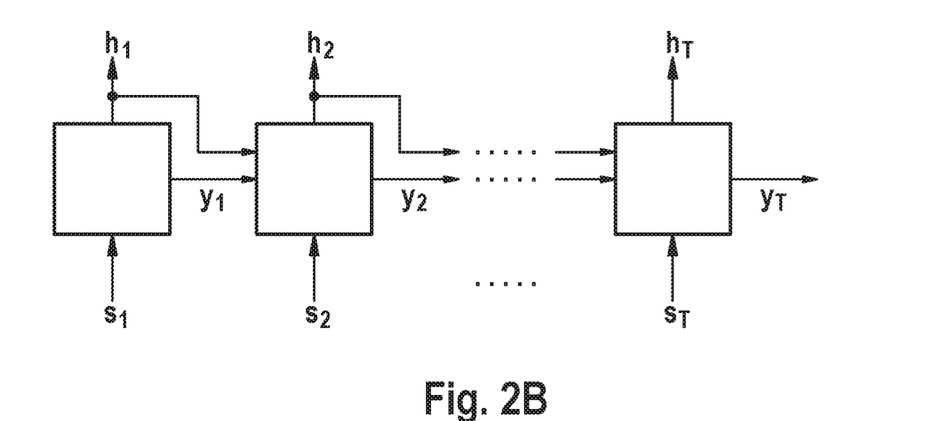
FIG. 2B schematically shows a conventional LSTM neural network.

A preferred embodiment uses an LSTM neural network which is basically described in conjunction with FIGS. 2A and 2B.

FIGS. 2A and 2B schematically show an LSTM node and an illustration of a recurrent processing of timely consecutive data $s_{1\ldots T}$ which is conventional in the art. Basically, a LSTM node 5 includes an input gate 6, a forget gate 7 and an output gate 8 which are used to generate an internal node state $h_t$ and an output $y_t$. By cascading multiple LSTM nodes with their internal node state $h_t$ and output $y_t$ to respective inputs of a succeeding LSTM node as shown in FIG. 2B, a layer of an LSTM network can be formed.

The hidden outputs $h_{t=1\ldots T}$ from first or any of the next layers layer can be fed to a succeeding layer as input to form a deep multi-layer network. The number of layers generally allows to learn more expressive internal representation of inputs in principle.

Figure 3:
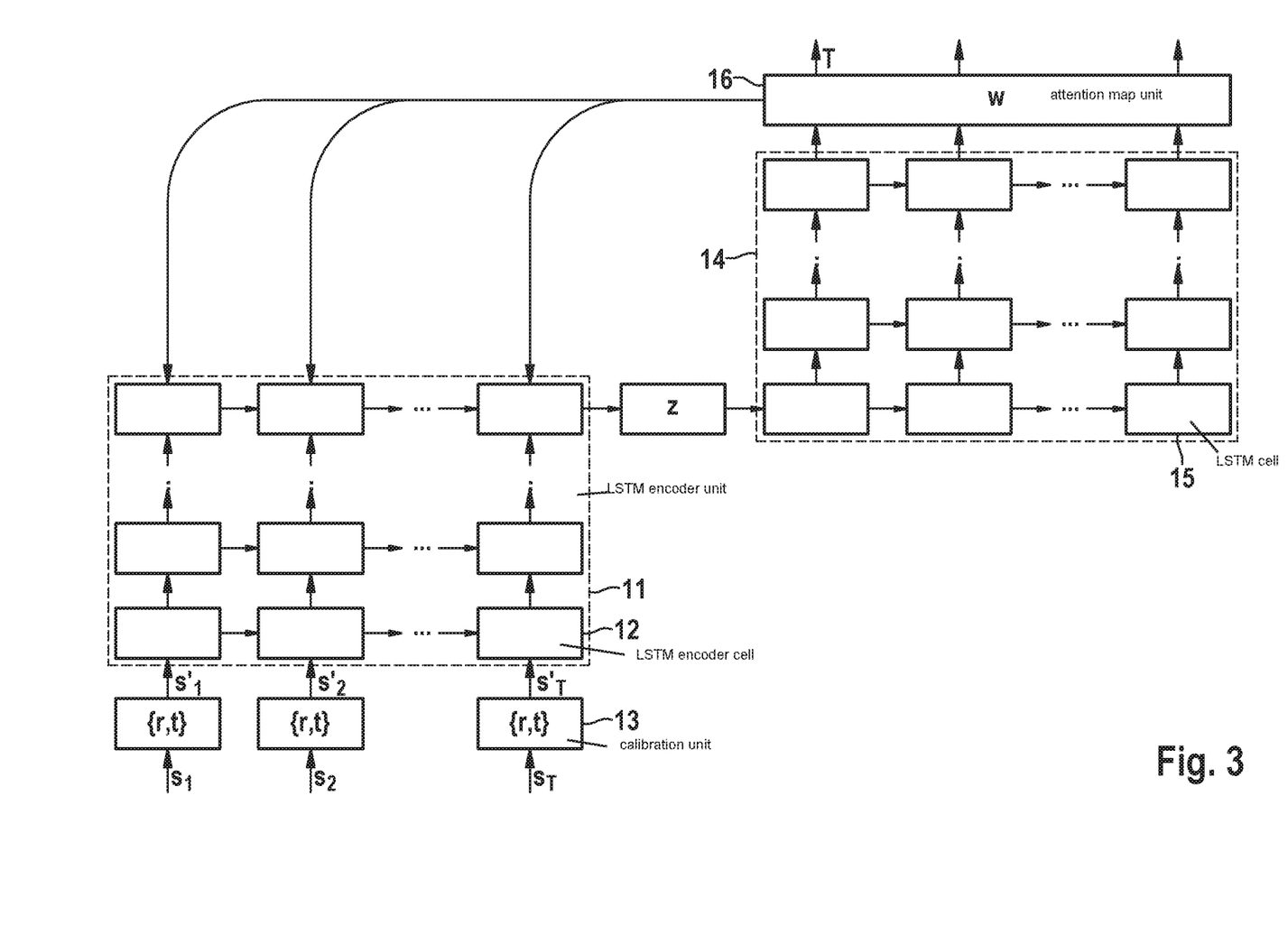
FIG. 3 schematically shows an LSTM encoder/decoder neural network used for automatically calibrating a sensor to a reference sensor by determining a calibration vector.

It has been found that for the time step-based trajectory match, an LSTM encoder/decoder neural network with an attention map is well suited. Such an LSTM encoder/decoder neural network is shown in FIG. 3 and is used to calibrate one of the sensors 2b, 2c, 2d to be calibrated with respect to the reference trajectory $T_{ref}$, e.g., provided by the reference sensor 2a. Furthermore, the reference trajectory $T_{ref}$ can be provided by the control data for the motion driver of the robot or the like. In other words if the trajectory on which the robot is moved is known from the traction control or from external observation this data can be used as the reference trajectory.

The configuration of FIG. 3 shows the LSTM encoder/decoder neural network 10 having an LSTM encoder unit 11 to which a calibrated trajectory of a sensor to be calibrated is fed. The an LSTM encoder unit 11 has a number of an LSTM encoder cells 12 each of which is formed as a LSTM cell as described above. The LSTM encoder cells 12 are sequentially coupled and arranged in a number of consecutive layers.

The calibrated trajectory is formed by a number of timely succeeding sensor readings $s_{1\ldots T}$ and obtained by applying a candidate calibration vector $(r_{cand}, t_{cand})$ (for training) or a previously determined calibration vector $(r, t)$ (for a trained system) onto each sensor reading value $s_{1\ldots T}$ of the different time instances $t=1\ldots T$ in a respective calibration unit 13. The data items of the calibrated sensor reading values $s'_{1\ldots T}$ at successive time steps are fed to a first layer formed by a number T of LSTM cells 12 as described above.

The trajectory data is propagated through a number of layers of LSTM cells 12 while the output data of the last layer of LSTM cells of the encoder LSTM unit 11 is compressed to a lower dimensional manifold, such as an intermediate vector z.

The intermediate vector z is generated by the last LSTM cell 12 of the last layer of the encoder LSTM unit 11. The last LSTM cell 12 has implemented a function mapping input which maps to a lower dimension intermediate vector z by multiplying a matrix with size n*m, where the dimension n is the size of $h_T/y_T$ and where the dimension m is much smaller than n (original input dimension).

The output $y_T$ of the last LSTM cell 12 is transformed by a given non-linear transformation to obtain the intermediate vector z.

The intermediate vector z is serially transferred to the input of a first LSTM cell 12 of the decoder unit. For instance, the non-linear transformation may be $$z = \sigma(w y^T + b).$$

which uses the output $y^T$ of last LSTM cell where $\sigma(\cdot)$ is an activation function, e.g., sigmoid, which is nonlinear.

The projection mentioned above is all computed automatically by error backpropagation, since the weights of the LSTM cells 12 are optimized by computing the z vector to recover trajectories as being base frames.

The intermediate vector z includes the data of the calibrated trajectory in a compressed manner, so that the data of the intermediate vector z represent the sensor trajectory.

The intermediate vector z is thereafter supplied to a decoder LSTM unit 14 which has a plurality of layers of a number T of LSTM cells 15 sequentially arranged. The decoder LSTM unit 14 has the same time step dimension T as the encoder LSTM unit 11 so that the calibrated trajectory at the input of the encoder LSTM unit 11 can be reconstructed from the intermediate vector z.

In an attention map unit 16 the reconstructed trajectory is applied to an attention map to compensate for a time mismatch between the time base of the reference trajectory $T_{ref}$ and the trajectory $T_b$, $T_c$, $T_d$ to be calibrated. Informally, an attention map equips a neural network with the ability to focus on a subset of its inputs, i.e., on a subset of time steps.

Comparing the resulting reconstructed trajectory with the reference trajectory leads to an error which can be used to train the calibration vector, the encoder and decoder function and the attention map. The optimization problem can be written as:

$$\eta(r,t), f^{decoder}, g_{encoder}, W \sim \min \Sigma_t \| s_a^t - f^{decoder}(g_{encoder}(\eta_{(r,t)}(s_{k-(b,c,\ldots m)}^t))) + W_t^T s_{k-(b,c,\ldots m)} \|^2$$

wherein $s_a^t$ indicates the sensor reading values of a time step t for the reference sensor 2a, $\eta(r,t)$ the calibration vector, $W_t^T$ an attention map and $g_{encoder}$ the encoder function and $f^{decoder}$ the decoder function.

The encoder LSTM unit 11 and the decoder LSTM unit 14 can be trained in a training phase by feeding data batches including sensor trajectories and reference trajectories and by training above parameters. Particularly, a first training phase includes the application of the reference trajectory without using the calibration units 13 (or by switching them to not rendering the respective reference trajectory data) to train the encoder and decoder function by minimizing the reconstruction error at the output of the decoder LSTM unit 14. The attention map unit 16 may be either deactivated or activated and applied with no time offset with respect to the reference trajectory.

In the second training phase as the attention map is input dependent, for each pair of a sensor trajectory and corresponding reference trajectory. However, as in the first training phase only the reference trajectory is applied which has no time offset with respect to itself the attention map can be deactivated.

In a second training phase a sensor trajectory to be calibrated is applied on the inputs of the calibration units and the encoder LST unit and the decoder LSTM unit 14 as well as the attention map are trained to reduce the reconstruction error. The reconstruction error is determined by a distance between the reconstructed trajectory (which is obtained by using calibration units, the encoder LSTM unit, decoder LSTM unit and the attention map unit) and the corresponding reference trajectory.

Both training phases can be alternately carried out each for a plurality of training cycles.

Figure 4:
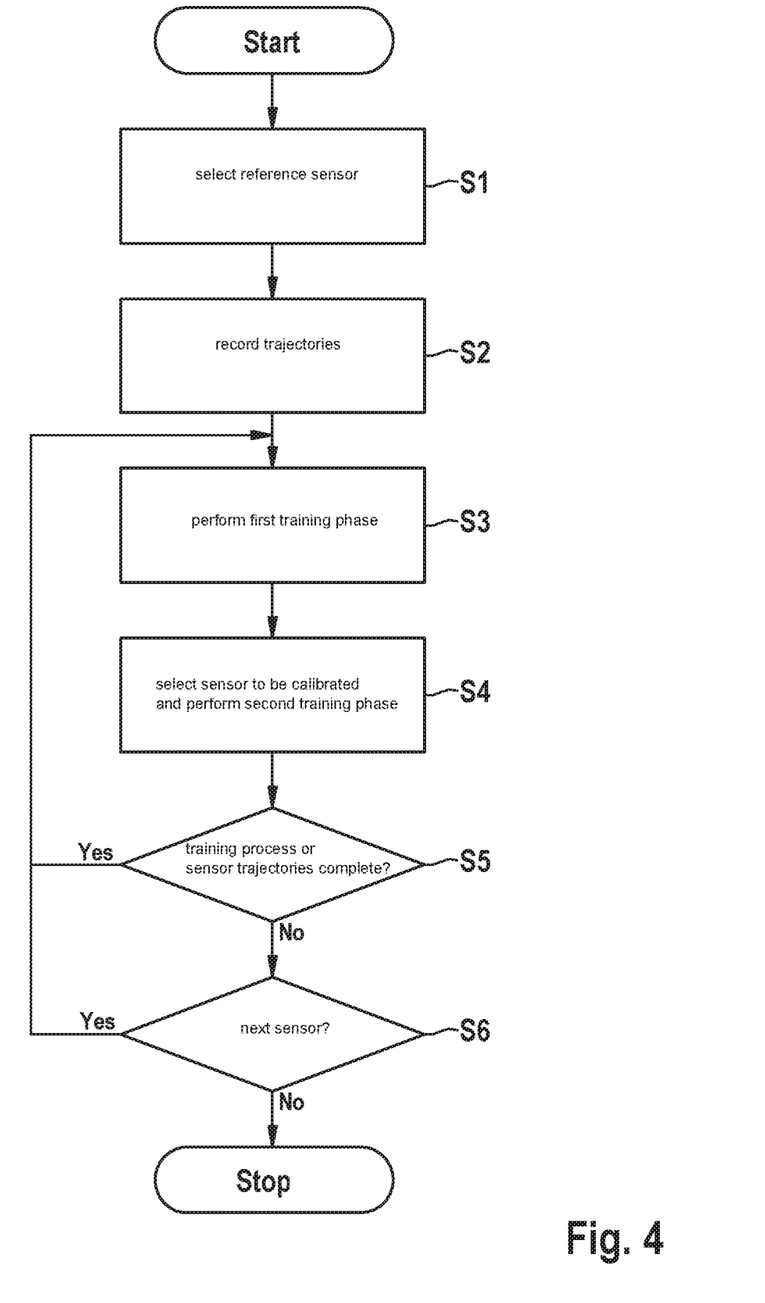
FIG. 4 shows a flowchart indicating the process for automatically calibrating the sensor of a multi-sensor system.

In the flowchart of FIG. 4, the process of calibration of the sensors 2 of the sensor system of the aforementioned robot 1 is described.

In step S1, among the sensors 2 of the sensor system, a reference sensor 2a is selected. All other sensors 2b, 2c, 2d will be calibrated with respect to the selected reference sensor 2a.

In step S2, trajectories are recorded for each of the sensors 2, e.g., by moving the robot along a random or predetermined path. Thereby, a reference trajectory Tref can be obtained from the sensor readings of the reference sensor 2a and further sensor trajectories can be obtained from the other sensors 2b, 2c, 2d. Alternatively, sensor trajectories can be obtained from moving the robot 1 along one or more known motion paths which correspond to a respective reference trajectory. The number of training trajectories is selected so that the set of training trajectory data is sufficient to train the LSTM encoder/decoder neural network 10 as described above.

In step S3, the first training phase is performed. Therein, the various reference trajectories are used to train the LSTM encoder/decoder network 10 by minimizing the reconstruction error of propagating each of the reference trajectories through the encoder LSTM unit 11 and the decoder LSTM unit 14 according to above formula. The reconstruction error can be e.g. defined as a distance between the reconstructed trajectory at an output trajectory of the decoder LSTM unit 14 and the reference trajectory. Thereby, parameters for the encoder function $f_{encoder}$ and the decoder function $g^{decoder}$ can be trained applying a conventional method such as by backpropagation.

Following the training related to the reference trajectories, one of the sensors 2b, 2c, 2d to be calibrated is selected in step S4 and initially a candidate calibration vector (r,t) (as an initial calibration vector) is assumed. By means of the calibration unit the candidate calibration vector is applied on the sensor reading values of the sensor trajectory of the sensor 2b, 2c, 2d to be calibrated before supplying them to the input of the encoder LSTM unit 11.

The second training phase is carried out by propagating the calibrated sensor trajectories through the LSTM encoder/decoder neural network 10 and a reconstructed trajectory is respectively obtained at the output of the attention map unit. The reconstruction error between the reconstructed trajectory and the reference trajectory belonging to the same time frame is used to optimize the calibration vector, the encoder function, the decoder function and the attention matrix W for the respective sensor 2b, 2c, 2d.

In step S5 it is checked it the training process for the various sensor trajectories of the respective sensor has been completed. This can be done by applying a respective convergence criteria, by reaching a number of iterations or the like. If the training process has not been completed (alternative: yes) it is returned to step S3. Otherwise (alternative: no) the process is continued with step S6. The above steps S3, S4 of optimization are repeated for the various motion paths (time frames), i.e. the various sensor trajectories for which sensor trajectories of the respective (selected) sensor and associated reference trajectories are available.

In step S6 it is checked if a next sensor 2 of the sensor system shall be calibrated. If there is a next sensor to be calibrated (alternative: yes) then the method is continued by step S3 using the various sensor trajectories T of the corresponding next sensor. Otherwise (alternative: no), the process is discontinued.

The so obtained calibration vector $W^T_t$ can be applied on the sensor reading of the respective sensor associated with the respective calibration vector $W^T_t$ by the product of $W^T_t s^t_{b,c,d}$ for sensors 2b, 2c, 2d.

What is claimed is:

1. A method for calibrating a sensor with respect to a reference trajectory indicating a number of timely successive data values using an encoder/decoder neural network with an encoder function and a successive decoder function, the method comprising the steps of:
    training, in a first training phase, the encoder function and the decoder function of the encoder/decoder neural network with respect to a reference trajectory so that a reconstruction error of the reference trajectory at an input of the encoder function and a reconstructed reference trajectory at an output of the decoder function is minimized;
    training, in a second training phase, a calibration vector with respect to a sensor trajectory so that a reconstruction error between an output sensor trajectory and a corresponding reference trajectory is minimized, wherein the output sensor trajectory is obtained by applying the calibration vector on the sensor trajectory and by applying the encoder function and decoder function on the sensor trajectory; and
    applying the calibration vector to calibrate the sensor.

2. The method according to claim 1, wherein the first training phase and the second training phase are alternately applied each for a number of training cycles until a convergence criteria is satisfied.

3. The method according to claim 1, wherein the step of training in the second training phase includes training of the calibration vector, the encoder function, and the decoder function, of the encoder/decoder neural network.

4. The method according to claim 1, wherein in the second training phase, an attention map is considered which is applied on the output sensor trajectory of the decoder function, and wherein the training in the second training phase is configured to minimize the reconstruction error between the output sensor trajectory to which the attention map is applied and a corresponding reference trajectory.

5. The method according to claim 1, wherein the encoder function and decoder function corresponds to an encoder LSTM function and a decoder LSTM function, respectively.

6. The method according to claim 1, wherein the encoder function is configured to generate an intermediate vector corresponding to a lower dimensional manifold, and the decoder function is configured to expand the output trajectory having a same dimension as the input trajectory.

7. The method according to claim 1, wherein the sensor trajectory of the sensor to be calibrated and the corresponding reference trajectory are related to the same time frame.

8. The method according to claim 1, wherein the reference trajectory is obtained by a reference sensor wherein the reference sensor and the sensor to be calibrated belong to the same multi-sensor system.

9. A sensor system, comprising:
multiple sensors for obtaining sensor trajectories;
an encoder/decoder neural network with an encoder function and a successive decoder function;
a control unit configured to calibrate at least one of the multiple sensors with respect to a reference trajectory by:
  training, in a first training phase, the encoder function and the decoder function of the encoder/decoder neural network with respect to a reference trajectory so that a reconstruction error of the reference trajectory at an input of the encoder function and a reconstructed reference trajectory at an output of the decoder function is minimized;
  training, in a second training phase, a calibration vector with respect to a sensor trajectory so that a reconstruction error between an output sensor trajectory and a corresponding reference trajectory is minimized, wherein the output sensor trajectory is obtained by applying the calibration vector on the sensor trajectory and by applying the encoder function and decoder function on the sensor trajectory; and
  applying the calibration vector to calibrate the sensor.

10. A non-transitory machine readable medium on which is recorded a computer program for calibrating a sensor with respect to a reference trajectory indicating a number of timely successive data values using an encoder/decoder neural network with an encoder function and a successive decoder function, the computer program, when executed by a computer, causing the computer to perform:

training, in a first training phase, the encoder function and the decoder function of the encoder/decoder neural network with respect to a reference trajectory so that a reconstruction error of the reference trajectory at an input of the encoder function and a reconstructed reference trajectory at an output of the decoder function is minimized;

training, in a second training phase, a calibration vector with respect to a sensor trajectory so that a reconstruction error between an output sensor trajectory and a corresponding reference trajectory is minimized, wherein the output sensor trajectory is obtained by applying the calibration vector on the sensor trajectory and by applying the encoder function and decoder function on the sensor trajectory; and applying the calibration vector to calibrate the sensor.

* * * * *